(12) United States Patent
Hatakeyama

(10) Patent No.: US 8,767,318 B2
(45) Date of Patent: *Jul. 1, 2014

(54) CATADIOPTRIC LENS SYSTEM AND IMAGING APPARATUS

(75) Inventor: Takeshi Hatakeyama, Chiba (JP)

(73) Assignee: Sony Corporation, Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 13/482,641

(22) Filed: May 29, 2012

(65) Prior Publication Data

US 2013/0010376 A1     Jan. 10, 2013

(30) Foreign Application Priority Data

Jul. 5, 2011   (JP) ................. 2011-149111

(51) Int. Cl.
*G02B 17/00*     (2006.01)
*G02B 23/02*    (2006.01)
*G02B 17/08*    (2006.01)

(52) U.S. Cl.
CPC ........ *G02B 17/0808* (2013.01); *G02B 17/0804* (2013.01)
USPC ............................ 359/731; 359/729; 359/366

(58) Field of Classification Search
USPC .......... 359/726–736, 364–366, 399, 785, 690
See application file for complete search history.

(56) References Cited

U.S. PATENT DOCUMENTS

| | | | | |
|---|---|---|---|---|
| 4,443,068 A * | 4/1984 | Itoh | .............. | 359/676 |
| 4,523,816 A * | 6/1985 | Kreitzer | ............. | 359/731 |
| 4,971,428 A * | 11/1990 | Moskovich | ............. | 359/366 |
| 6,169,637 B1 * | 1/2001 | Tsunashima | ............. | 359/726 |
| 2009/0102937 A1* | 4/2009 | Yilmaz et al. | ............. | 348/222.1 |
| 2013/0010180 A1* | 1/2013 | Hatakeyama | ............. | 348/360 |

FOREIGN PATENT DOCUMENTS

| | | |
|---|---|---|
| JP | 55-032023 | 3/1980 |
| JP | 58-205124 | 11/1983 |

* cited by examiner

*Primary Examiner* — Aliciai M Harrington
*Assistant Examiner* — Marin Pichler
(74) *Attorney, Agent, or Firm* — Rader, Fishman & Grauer PLLC

(57) ABSTRACT

A catadioptric lens system includes, in order of light travel: a first lens group that includes a concave mirror and a convex mirror and has a positive refractive power; a second lens group that is positioned on the image side of the concave mirror and has a negative refractive power; and a third lens group that has a positive refractive power, wherein a close-range object is brought into focus by moving the second lens group in a direction parallel with the optical axis, and wherein the following conditional expression is satisfied $$0 < f/f12 \qquad (0)$$

where
  f is a focal length of the whole system in a state where the focus is at infinity, and
  f12 is a composite focal length of the first lens group and the second lens group in a state where the focus is at infinity.

16 Claims, 9 Drawing Sheets

EXAMPLE 1

EXAMPLE 2

EXAMPLE 3

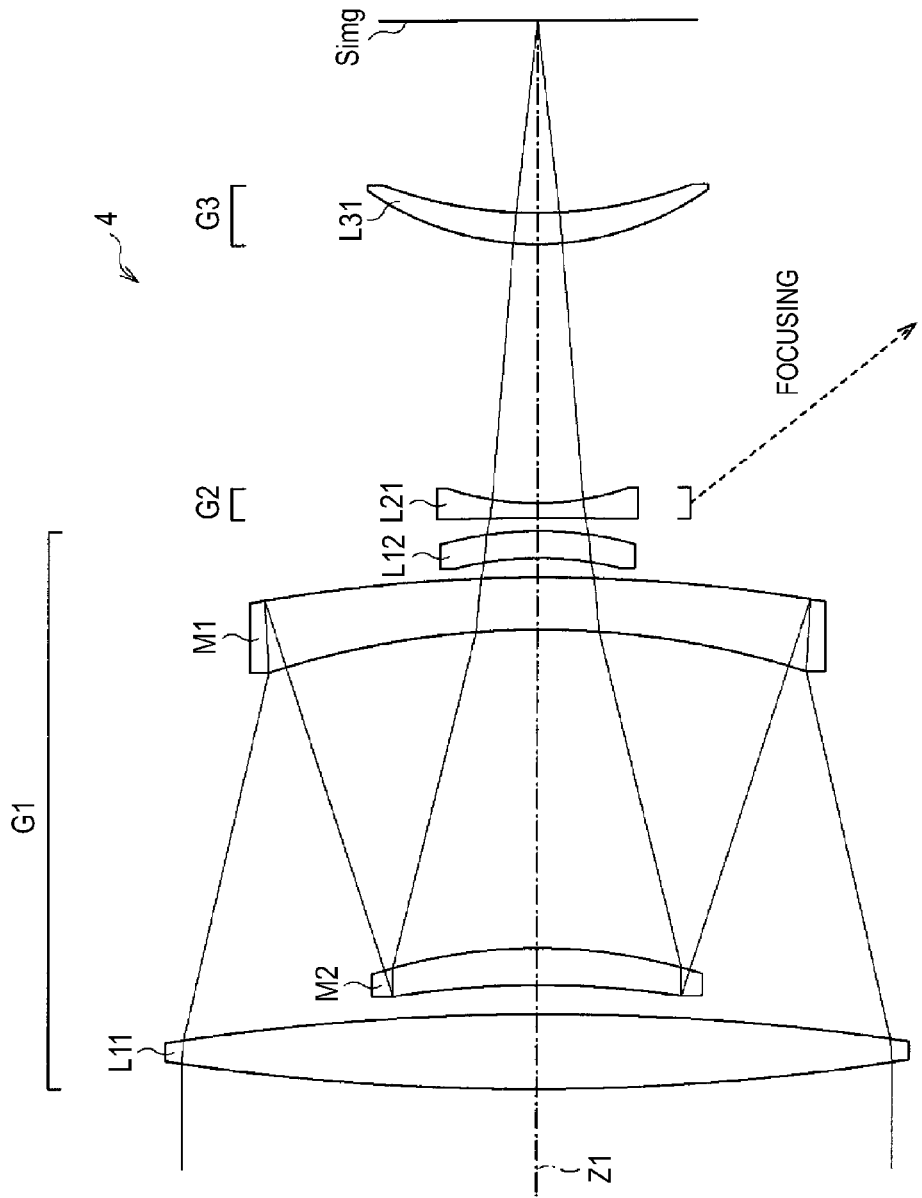

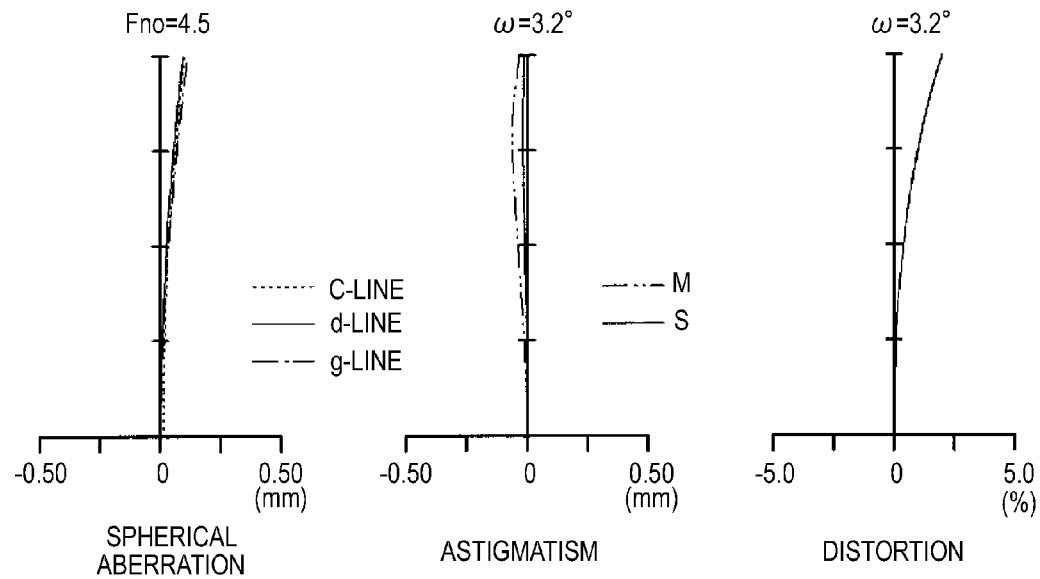
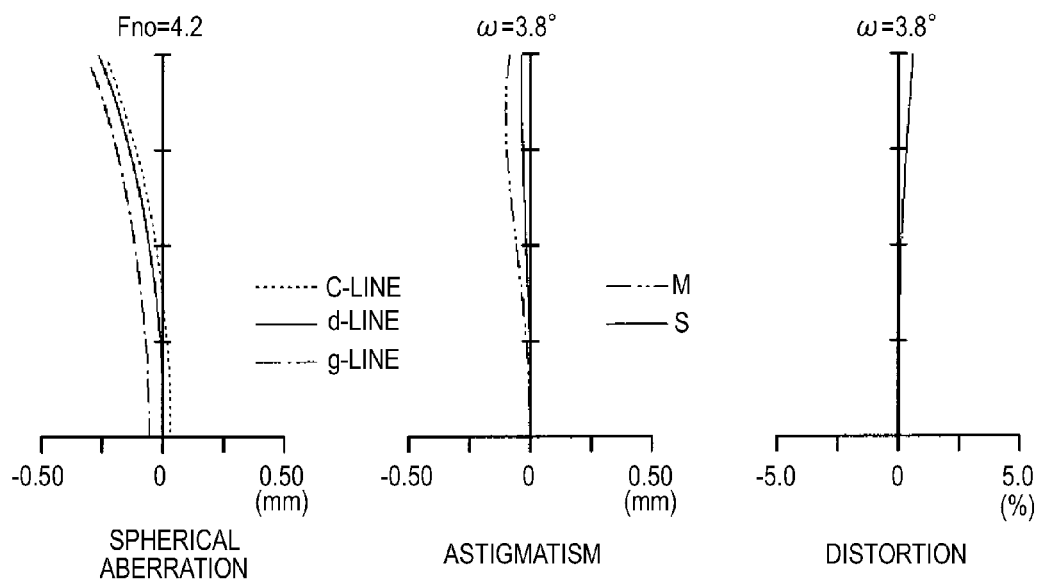

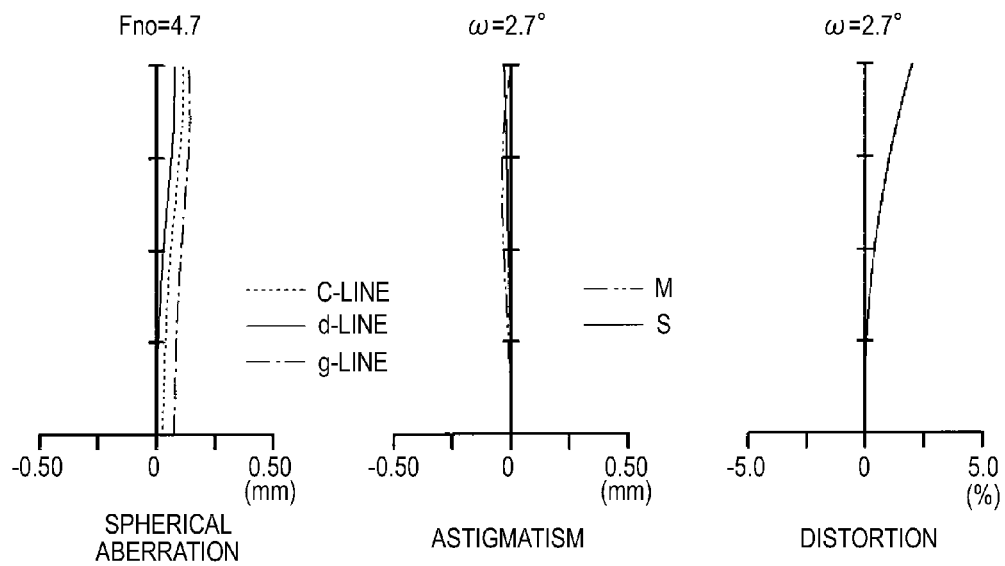
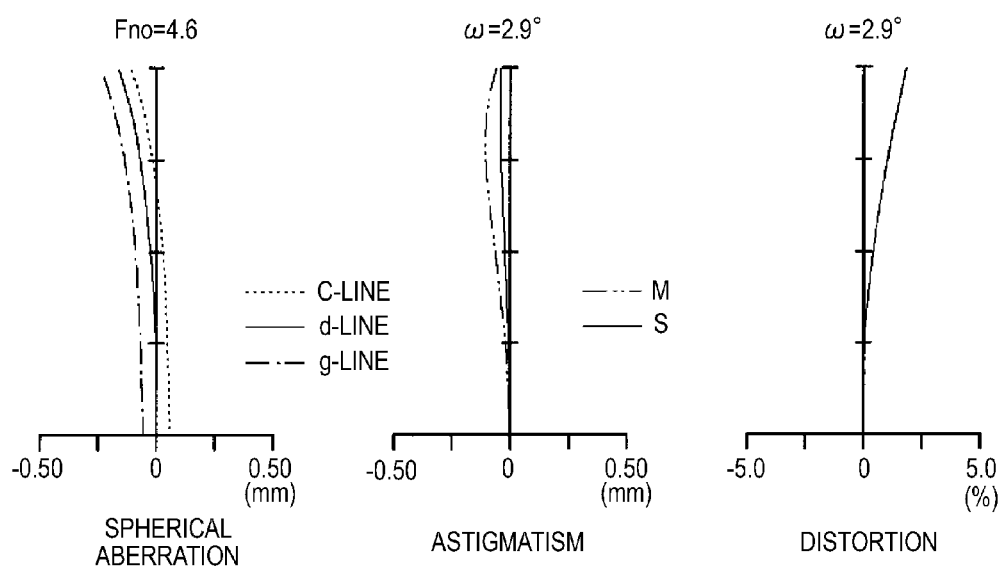

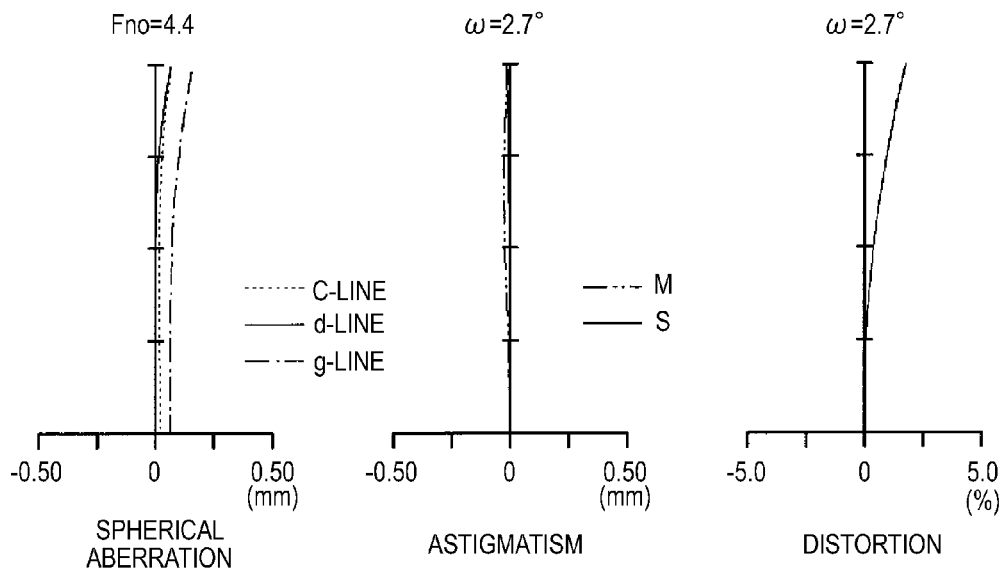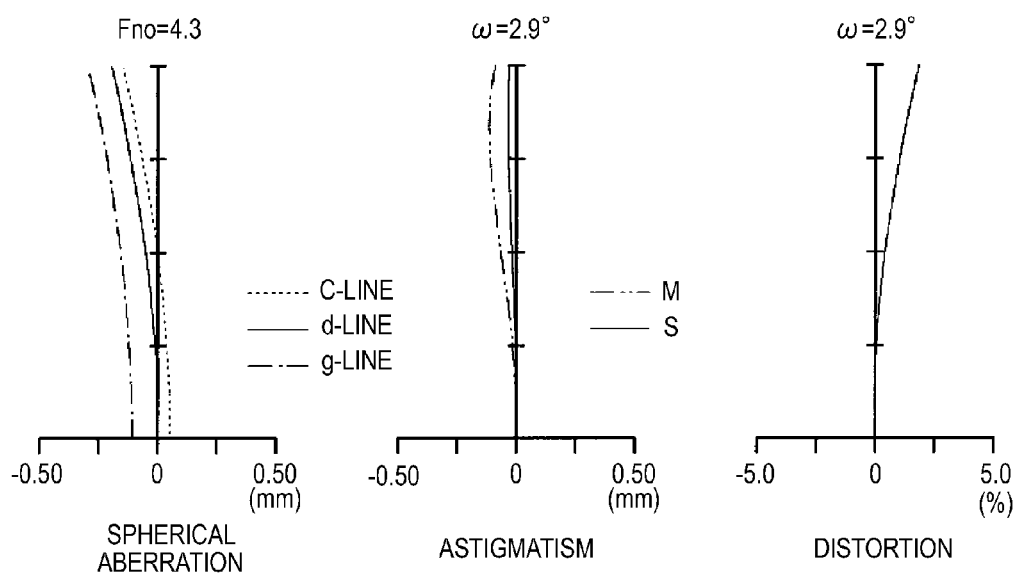

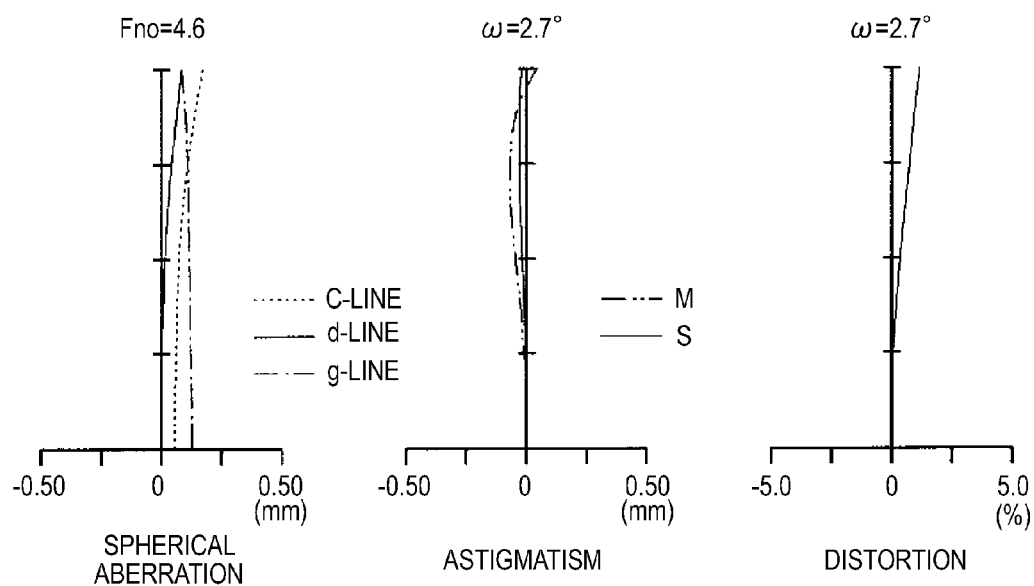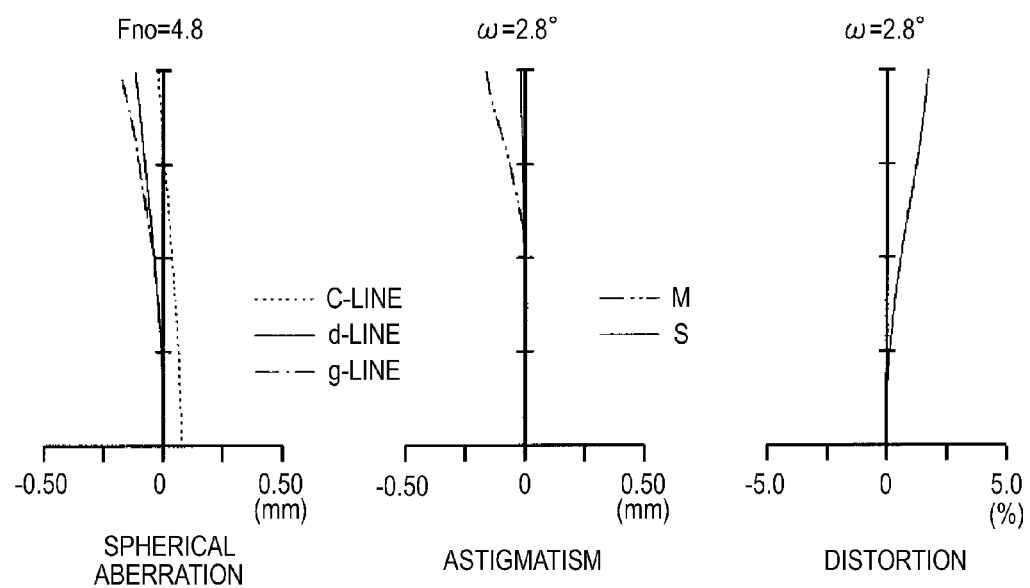

CATADIOPTRIC LENS SYSTEM AND IMAGING APPARATUS

FIELD

The present disclosure relates to a catadioptric long-focus lens system, of which the focusing mode is an inner focusing mode and which is quite appropriate to capture not only a still image but also a moving image, and an imaging apparatus having the catadioptric lens system.

BACKGROUND

It is generally known that a catadioptric lens system having a reflective system and a refractive system is highly advantageous in reducing the length of the whole lens and reducing chromatic aberration, and is configured to be appropriate for a long-focus lens. For example, in JP-A-55-32023, it is possible to obtain favorable imaging performance through a catadioptric lens system that includes, in order of light travel, a positive single lens, a primary rear surface reflection mirror having a negative meniscus shape, a secondary rear surface reflection mirror having a positive meniscus shape, and a lens group having a negative refractive power.

As a focusing modes of the catadioptric lens system, a mode of varying the length of the whole lens, such as a mode of extending the whole lens or a mode of changing a space between two reflective surfaces, have been generally used. Further, for example, JP-A-58-205124 discloses a catadioptric lens system of an inner focusing mode in which the length of the whole optical system is invariant. The catadioptric lens system includes, in order of light travel: a first lens group that includes a reflecting member and has a positive refractive power; and a second lens group that is movable along the optical axis and has a negative refractive power; and a third lens group that has a positive refractive power. In the system, in a state where the focus is at infinity, an afocal system is formed of the first lens group and the second lens group, and the second lens group is moved to be close to the image side, whereby a close-range object is brought into focus.

Meanwhile, in recent years, there have been provided so-called single-lens mirrorless cameras each having portability which is improved by removing mirrors from a single-lens reflex camera so as to simplify a camera structure. The single-lens mirrorless camera is appropriate to capture a moving image with high image quality since light constantly reaches an imaging device for image capturing contrary to the single-lens reflex camera. Further, a so-called wobbling technique has been used. In the technique, in the case of capturing a moving image, when an object is shifted back and forth relative to a camera during capturing, in order to bring the object into focus, the focal point is shifted in a direction capable of obtaining a high contrast value by minutely wobbling the focal point. When the focusing group is intended to perform the wobbling operation, it is preferable that the focusing group be configured to have a small size and be lightweight as much as possible by setting a focusing mode to the inner focusing mode. By making the focusing group have a small size and be lightweight, it is possible to reduce the size of the whole lens including a driving mechanism of the focusing group, and it is possible to reduce power consumption caused by focus driving.

SUMMARY

When the focusing mode is the mode of extending the whole lens, if the focal length of the lens is increased, the extension amount for focusing is extremely increased, and thus this mode is disadvantageous to reduction in size. Further, since it is necessary for the driving mechanism for continuously extending the whole lens to generate a large driving force, it is difficult to deal with capturing of a moving image through a wobbling operation.

When the focusing mode is the mode of changing the space between two reflective surfaces, it is possible to extremely decrease the extension amount, but it is necessary for the driving mechanism to generate a large driving force. Hence, likewise, it is difficult to deal with capturing of a moving image. Further, eccentricity between two reflective surfaces is extremely sensitive to the optical performance thereof, but it is difficult to sufficiently reduce the eccentricity caused by focusing in manufacturing. Furthermore, since change in distance between two reflective surfaces is also optically sensitive, a problem remains in design in that the fluctuation in aberration during close-up focusing is increased.

In the catadioptric lens system disclosed in JP-A-58-205124, the inner focusing mode is adopted, and the focusing group does not include a large mirror lens with a large weight. Hence, as compared with the mode of extending the whole lens or the mode of changing the space between two reflective surfaces, it is possible to decrease the driving force of the driving mechanism. However, since the focusing group is shifted between the two reflective surfaces, or near the reflective surfaces, it is difficult to secure sufficient space for arrangement of the driving mechanism. As a result, a problem arises in that the lens size is increased. Further, although a hole is bored at the center portion of the mirror lens and the optical system is disposed at the hole portion, it is difficult to perform processing of boring a hole through the mirror lens, and it is also difficult to provide a mechanism which holds the optical system near the hole portion. Furthermore, although the eccentricity of the focusing group is sensitive to the optical performance, it is difficult to sufficiently reduce the eccentricity caused by the focusing in manufacturing. In addition, in order to reduce the fluctuation in aberration during the close-up focusing, it is necessary to adopt a configuration in which the number of lenses is set to be large. As a result, there is a problem in that the weight of the focusing group is increased and the size of the driving mechanism is increased.

It is therefore desirable to provide a catadioptric long-focus lens system and an imaging apparatus, in which the focusing group has a small size and is lightweight and the size of the lens including the mechanism for driving the focusing group is also small and which are easily manufactured such that the sensitivity in eccentricity of the focusing group is small.

An embodiment of the present disclosure is directed to a catadioptric lens system including, in order of light travel: a first lens group that includes a concave mirror and a convex mirror and has a positive refractive power; a second lens group that is positioned on the image side of the concave mirror and has a negative refractive power; and a third lens group that has a positive refractive power. A close-range object is brought into focus by moving the second lens group in a direction parallel with the optical axis. In addition, the lens system satisfies the following conditional expression.

$$0 < f/f12 \tag{0}$$

where f is a focal length of the whole system in a state where the focus is at infinity, and f12 is a composite focal length of the first lens group and the second lens group in a state where the focus is at infinity.

Another embodiment of the present disclosure is directed to an imaging apparatus including: a catadioptric lens system; and an imaging device that outputs a captured image signal corresponding to an optical image which is formed by the catadioptric lens system. The catadioptric lens system is formed as the catadioptric lens system according to the embodiment of the present disclosure.

In the catadioptric lens system or the imaging apparatus according to the embodiment of the present disclosure, the second lens group, which is disposed on the image side of the concave mirror, is shifted as a focusing group.

According to the catadioptric lens system or the imaging apparatus of the embodiment of the present disclosure, the second lens group, which is disposed on the image side of the concave mirror, is formed as a focusing group, whereby the configuration of each group is optimized. Therefore, it is possible to obtain a long-focus lens system in which the focusing group has a small size and is lightweight and the size of the lens including the mechanism for driving the focusing group is also small and which is easily manufactured such that the sensitivity in eccentricity of the focusing group is small.

BRIEF DESCRIPTION OF THE DRAWINGS

FIG. 4 is a cross-sectional view of a lens corresponding to Numerical Example 4, and shows a fourth configuration example of the catadioptric lens system.

FIGS. 5A to 5C are aberration diagrams illustrating various aberrations during infinity focusing of the catadioptric lens system corresponding to Numerical Example 1, where FIG. 5A shows spherical aberration, FIG. 5B shows astigmatism, and FIG. 5C shows distortion.

FIGS. 6A to 6C are aberration diagrams illustrating various aberrations during close-up focusing (photography magnification ratio $\beta$=0.1) of the catadioptric lens system corresponding to Numerical Example 1, where FIG. 6A shows spherical aberration, FIG. 6B shows astigmatism, and FIG. 6C shows distortion.

FIGS. 7A to 7C are aberration diagrams illustrating various aberrations during infinity focusing of the catadioptric lens system corresponding to Numerical Example 2, where FIG. 7A shows spherical aberration, FIG. 7B shows astigmatism, and FIG. 7C shows distortion.

FIGS. 8A to 8C are aberration diagrams illustrating various aberrations during close-up focusing (photography magnification ratio $\beta$=0.1) of the catadioptric lens system corresponding to Numerical Example 2, where FIG. 8A shows spherical aberration, FIG. 8B shows astigmatism, and FIG. 8C shows distortion.

FIGS. 9A to 9C are aberration diagrams illustrating various aberrations during infinity focusing of the catadioptric lens system corresponding to Numerical Example 3, where FIG. 9A shows spherical aberration, FIG. 9B shows astigmatism, and FIG. 9C shows distortion.

FIGS. 10A to 10C are aberration diagrams illustrating various aberrations during close-up focusing (photography magnification ratio $\beta$=0.1) of the catadioptric lens system corresponding to Numerical Example 3, where FIG. 10A shows spherical aberration, FIG. 10B shows astigmatism, and FIG. 10C shows distortion.

FIGS. 11A to 11C are aberration diagrams illustrating various aberrations during infinity focusing of the catadioptric lens system corresponding to Numerical Example 4, where FIG. 11A shows spherical aberration, FIG. 11B shows astigmatism, and FIG. 11C shows distortion.

FIGS. 12A to 12C are aberration diagrams illustrating various aberrations during close-up focusing (photography magnification ratio $\beta$=0.1) of the catadioptric lens system corresponding to Numerical Example 4, where FIG. 12A shows spherical aberration, FIG. 12B shows astigmatism, and FIG. 12C shows distortion.

DETAILED DESCRIPTION

Hereinafter, embodiments of the present disclosure will be described with reference to the accompanying drawings.

[Lens Configuration]

Figure 1:
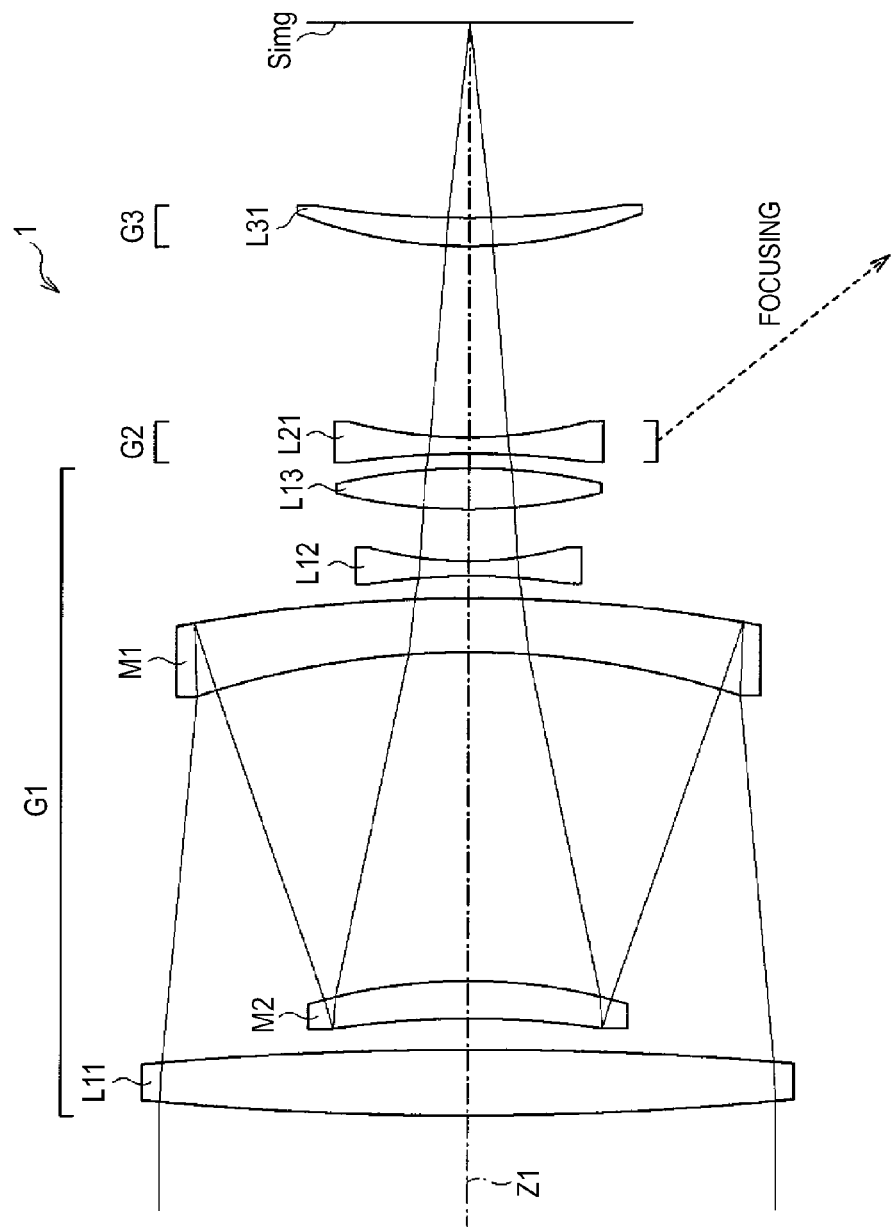
FIG. 1 is a cross-sectional view of a lens corresponding to Numerical Example 1, and shows a first configuration example of a catadioptric lens system according to an embodiment of the present disclosure.
Figure 2:
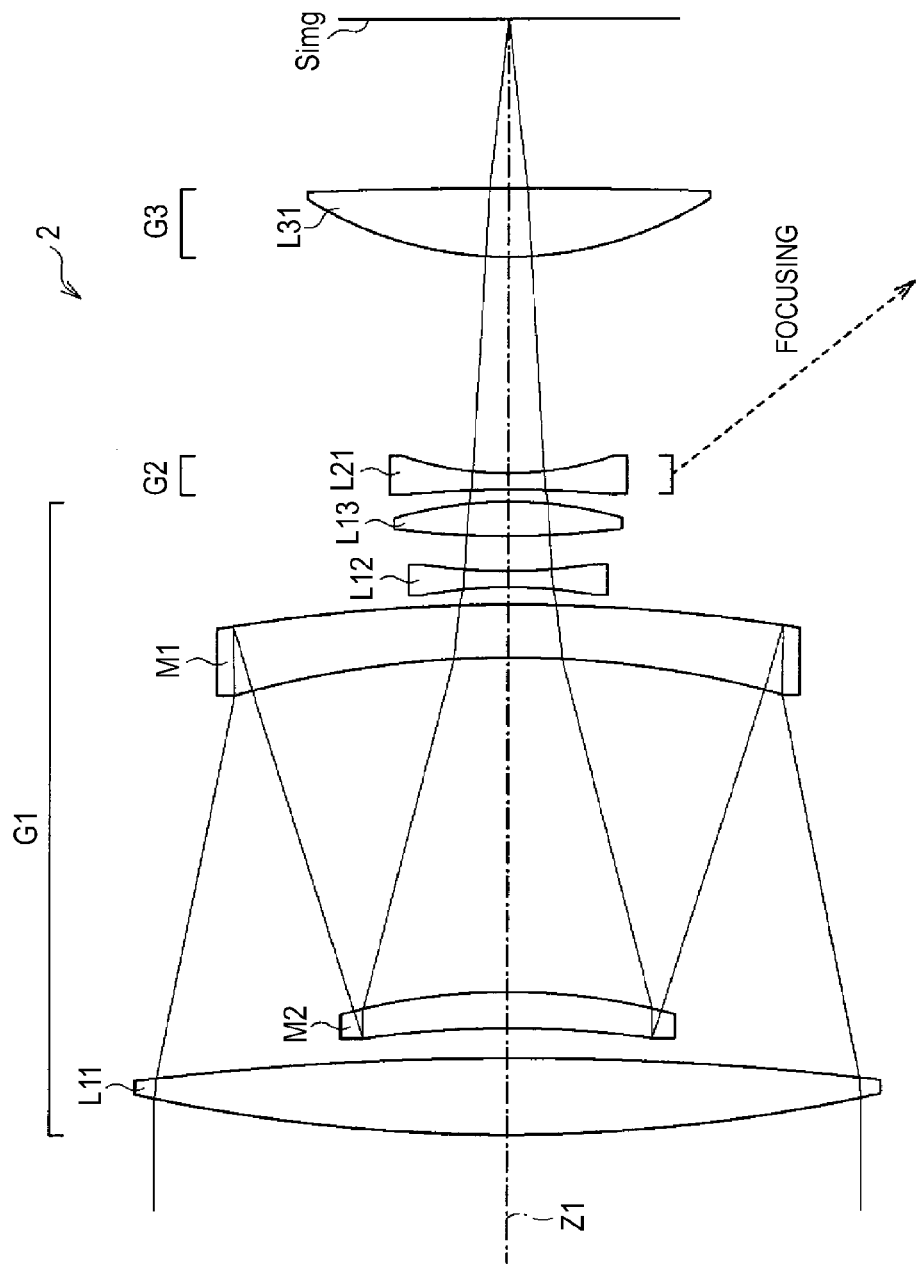
FIG. 2 is a cross-sectional view of a lens corresponding to Numerical Example 2, and shows a second configuration example of the catadioptric lens system.
Figure 3:
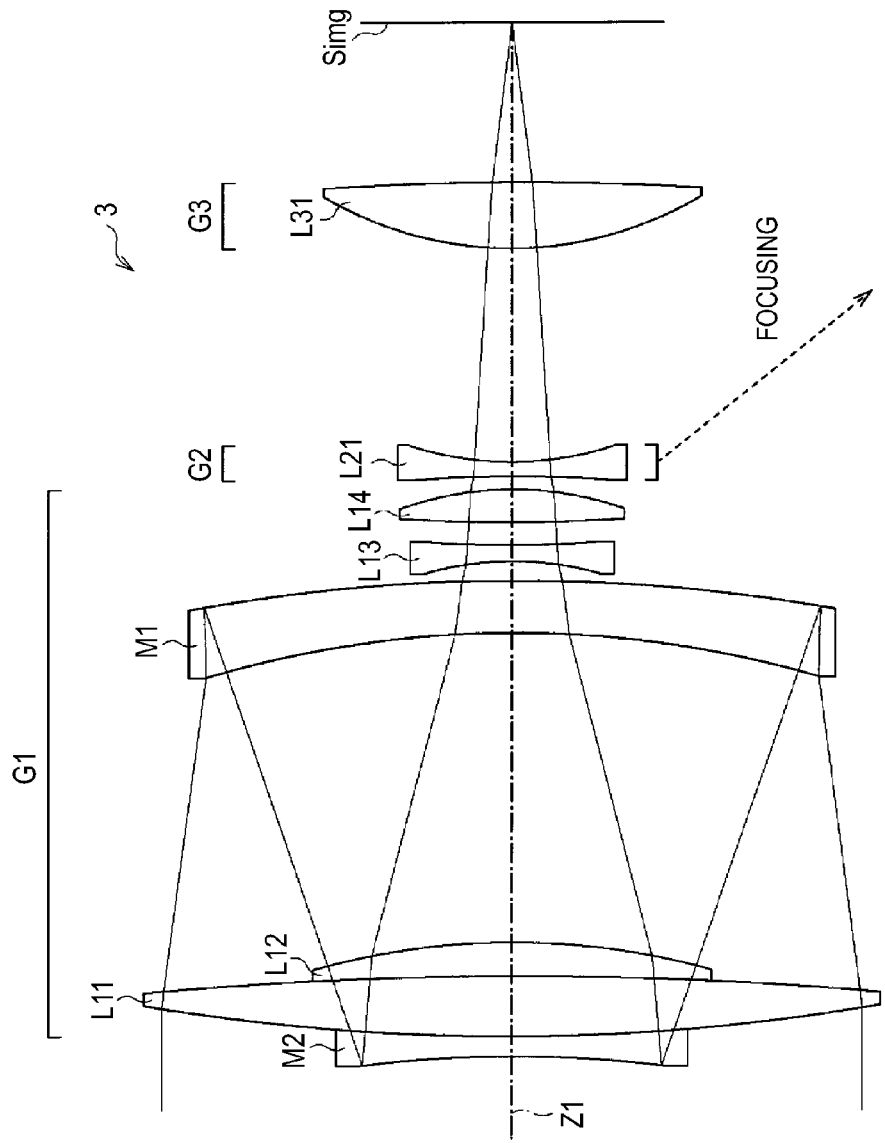
FIG. 3 is a cross-sectional view of a lens corresponding to Numerical Example 3, and shows a third configuration example of the catadioptric lens system.

FIG. 1 shows a first configuration example of a catadioptric lens system according to an embodiment of the present disclosure. The configuration example corresponds to a lens configuration of Numerical Example 1 to be described later. Note that, FIG. 1 corresponds to lens arrangement during infinity focusing. Likewise, FIGS. 2 to 4 show configurations of the cross sections of second to fourth configuration examples corresponding to lens configurations of Numerical Examples 2 to 4 to be described later. In FIGS. 1 to 4, the reference sign Simg represents the image plane.

The catadioptric lens system according to the present embodiment includes, in the order that light travels from the object side along the optical axis Z1: a first lens group G1 that includes a concave mirror (primary mirror) M1 and a convex mirror (secondary mirror) M2 and has a positive refractive power; a second lens group G2 that is positioned on the image side of the concave mirror M1 and has a negative refractive power; and a third lens group G3 that has a positive refractive power. The catadioptric lens system is focused on the close-range object by shifting the second lens group G2 in the direction substantially parallel with the optical axis Z1. The first lens group G1 and the third lens group G3 remain stationary during focusing.

It is preferable that the second lens group G2 be formed of a single lens having a biconcave shape. It is preferable that the third lens group G3 be formed of a single lens of which the object-side surface has a convex shape.

It is preferable that the image-side surface of the concave mirror (primary mirror) M1 be formed by forming a reflective surface on a part of the image-side surface in a lens which is concave toward the object side. It is preferable that the object-side surface of the convex mirror M2 be formed by forming a reflective surface on the object-side surface in a lens which is convex toward the image side.

It is preferable that the catadioptric lens system according to the present embodiment appropriately satisfy the following conditional expressions. As described below, all the catadioptric lens systems 1 to 4 according to the first to fourth configuration examples as specific configuration examples satisfy the following conditional expressions.

$$0 < f/f12 \tag{0}$$

$$0.40 < f1/f < 0.80 \tag{1}$$

$$-0.20 < f2/f < -0.05 \tag{2}$$

$$0.40 < f/f12 < 1.00 \tag{3}$$

$$0.10 < f3/f < 0.40 \tag{4}$$

Here, f is the focal length of the whole system in a state where the focus is at infinity, f12 is the composite focal length of the first lens group G1 and the second lens group G2 in the state where the focus is at infinity, f1 is the focal length of the first lens group G1, f2 is the focal length of the second lens group G2, and f3 is the focal length of the third lens group G3.

Effects and Advantages

Next, effects and advantages of the catadioptric lens system according to the present embodiment will be described.

In the catadioptric lens system, the second lens group G2, which is positioned on the image side of the concave mirror M1 and has a negative refractive power, is set as the focusing group. Therefore, it is possible to use the large space between the concave mirror M1 and the imaging surface as a variable stroke of focus. Further, since the lens positioned on the image side of the concave mirror M1 has a relatively small diameter, it becomes easy to arrange the driving mechanism of the focusing group. In particular, in the single-lens mirrorless camera system, the focusing group and the different lens groups can even be disposed in the space in which a mirror box is disposed in the related art. Hence, it is possible to secure a sufficient focus stroke, and it is possible to reduce the size of the entirety including the lenses and the camera.

Further, each lens surface of the concave mirror M1 and the convex mirror M2 is formed as a reflective surface, whereby it is possible to obtain a degree of freedom in correcting aberrations of the concave mirror M1 and the convex mirror M2. Further, since the focusing group is positioned to be relatively close to the imaging surface, it is possible to make the focusing group have less effect on the optical performance and be formed of a small number of lenses. Furthermore, since the sensitivity in eccentricity of the focusing group is also small, it is easy to manufacture the system.

In the catadioptric lens system, the second lens group G2 is formed of a single lens having a biconcave shape. With such a configuration, it is possible to secure the focus stroke as much as possible, and it is possible to further improve adaptability to moving image capturing such as an increase in the speed of autofocus which is achieved by reducing the weight of the focusing group. As described above, the focusing group can be configured to be extremely lightweight, and thus it is possible to improve a function of capturing a moving image, and it is also possible to reduce power consumption.

Further, the third lens group G3 is formed of a single lens of which the object-side surface has a convex shape. With such a configuration, it is possible to secure the focus stroke as much as possible, and it is possible to satisfactorily correct image field curvature and lateral chromatic aberration through the positive refractive power of the convex surface on the object side. Thereby, the system can be configured to have a small size while satisfactorily correcting image field curvature and lateral chromatic aberration.

The Conditional Expression (1) defines the magnitude of the focal length f1 of the first lens group G1 relative to the focal length f of the whole lens system. If the result value of the Conditional Expression (1) is less than the lower limit thereof, the positive refractive power of the first lens group G1 is excessively increased. Hence, spherical aberration produced by the first lens group G1 is increased, and thus the image quality deteriorates. Further, fluctuation in spherical aberration produced by focusing is increased, and thus it is difficult to correct the aberration. In contrast, if the result value of the Conditional Expression (1) is greater than the upper limit thereof, the positive refractive power of the first lens group G1 is excessively decreased. Hence, the length of the whole lens is increased, the zoom ratio is increased, and thus this is disadvantageous to reduction in size.

The Conditional Expression (2) defines the magnitude of the focal length f2 of the second lens group relative to the focal length f of the whole lens system. If the result value of the Conditional Expression (2) is less than the lower limit thereof, the negative refractive power of the second lens group G2 is excessively decreased. Hence, the focus sensitivity of the focusing group is decreased, the focus stroke is increased, and the length of the whole lens is increased. Further, the diameter of the third lens group G3 is also increased, and thus this is disadvantageous to reduction in size. In contrast, if the result value of the Conditional Expression (2) is greater than the upper limit thereof, the negative refractive power of the second lens group G2 is excessively increased. Hence, the focus stroke is reduced, but fluctuation in spherical aberration and image field curvature produced by focusing is increased, and thus it is difficult to correct them.

Accordingly, by making the catadioptric lens system satisfy the Conditional Expressions (1) and (2), it is possible to sufficiently reduce the size thereof and satisfactorily correct fluctuation in aberration produced by focusing. In order to improve this effect, it is more preferable that the numerical ranges of the Conditional Expressions (1) and (2) be set as the following Conditional Expressions (1)' and (2)'.

$$0.54 < f1/f < 0.62 \quad (1)'$$

$$-0.15 < f2/f < -0.09 \quad (2)'$$

The Conditional Expression (0) defines the magnitude of the focal length f of the whole lens system relative to the composite focal length f12 of the first lens group G1 and the second lens group G2. If the result value of the Conditional Expression (0) is close to the lower limit, this means that, in the state where the focus is at infinity, an afocal system is formed by the first lens group G1 and the second lens group G2. In this case, load to the aberration correction between the second lens group G2 and the third lens group G3 is increased. As a result, the number of lenses is increased. By satisfying the Conditional Expression (0), it is possible to reduce the size of the system while achieving favorable optical performance even in a case where the number of lenses is small. In order to improve this effect, it is more preferable that the numerical range of the Conditional Expression (0) be set as the Conditional Expression (3) below.

If the result value of the Conditional Expression (3) is less than the lower limit thereof, the rays emitted from the second lens group G2 are approximately afocal. Hence, load to the aberration correction between the second lens group G2 and the third lens group G3 is increased. As a result, the number of lenses is increased. In contrast, if the result value of the Conditional Expression (3) is greater than the upper limit thereof, the positive refractive power of the composition of the first lens group G1 and the second lens group G2 is excessively increased, the length of the whole optical system is increased, and the zoom ratio is also increased. As a result, this is disadvantageous to reduction in size. Accordingly, by satisfying the Conditional Expression (3), it is possible to reduce the size of the system while achieving favorable optical performance even in a case where the number of lenses is small. In order to improve this effect, it is more preferable that the numerical range of the Conditional Expression (3) be set as the following Conditional Expression (3)'.

$$0.55 < f/f12 < 0.74 \quad (3)'$$

The Conditional Expression (4) defines the magnitude of the focal length of the third lens group G3 relative to the focal length f of the whole lens system. If the result value of the Conditional Expression (4) is less than the lower limit thereof, the positive refractive power of the third lens group G3 is excessively increased. Hence, the diameter of the third lens group G3 is increased, and thus this is disadvantageous to reduction in size. In contrast, if the result value of the Conditional Expression (4) is greater than the upper limit thereof, the positive refractive power of the third lens group G3 is insufficient. Hence, the length of the whole optical system is increased, and thus this is disadvantageous to reduction in size. Accordingly, by making the catadioptric lens system satisfy the Conditional Expression (4), it is possible to sufficiently reduce the size of the system in the diameter direction and the direction of the length of the whole system. In order to improve this effect, it is more preferable that the numerical range of the Conditional Expression (4) be set as the following Conditional Expression (4)'.

$$0.14 < f3/f < 0.29 \tag{4}'$$

As described above, according to the catadioptric lens system according to the present embodiment, it is possible to obtain a long-focus lens system in which the focusing mode is an inner focusing mode, the focusing group has a small size and is lightweight, and the size of the lens including the mechanism for driving the focusing group is also small and which is easily manufactured such that the sensitivity in eccentricity of the focusing group is small.

Further, by applying the catadioptric lens system to an imaging apparatus and performing electric image processing, the length of the whole optical system is shortened, and the lens diameter of the first lens group G1 is reduced, and thus it is possible to further reduce the size of the lens system.

[Application Example of Imaging Apparatus]

Figure 13:
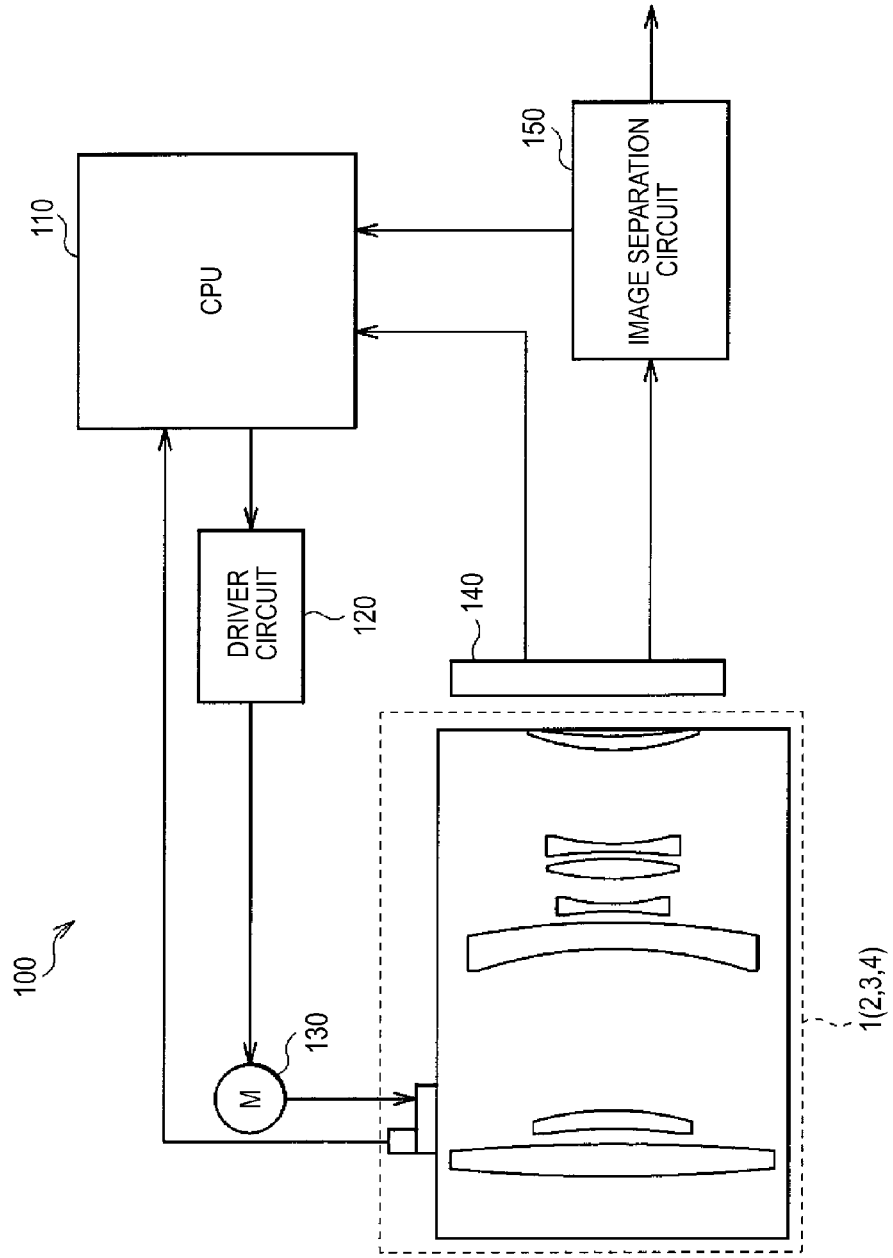
FIG. 13 is a block diagram illustrating a configuration example of an imaging apparatus.

FIG. 13 shows a configuration example of an imaging apparatus 100 to which the catadioptric lens system 1 according to the present embodiment is applied. The imaging apparatus 100 is, for example, a digital still camera. A CPU (Central Processing Unit) 110 integrally controls the overall apparatus, converts an optical image, which is obtained by the catadioptric lens system 1 (or catadioptric lens system 2, 3, or 4 shown in FIG. 2, 3, or 4) shown in FIG. 1, into an electrical signal by an imaging device 140, and then outputs the signal to an image separation circuit 150. Here, as the imaging device 140, a photoelectric conversion element, such as a CCD (Charge Coupled Device), a CMOS (Complementary Metal-Oxide Semiconductor), is used. The image separation circuit 150 generates a focus control signal on the basis of the electrical signal, outputs this signal to the CPU 110, and outputs the image signal corresponding to an image portion of the electrical signal to an image processing circuit (not shown in the drawing) in the subsequent stage. The image processing circuit converts the received signal into a signal having a format appropriate for the subsequent processing. The converted signal is supplied for image display processing in a display section, recording processing on a prescribed recording medium, data transfer processing through a predetermined communication interface, and the like.

The CPU 110 receives an operation signal such as a focusing operation which is input from the outside, and performs a variety of processing in response to the operation signal. For example, when a focusing operation signal produced by a focusing button is supplied, the CPU 110 operates a drive motor 130 through a drive circuit 120 so as to attain the in-focus state according to the instruction. Thereby, the CPU 110 of the imaging apparatus 100 shifts the focusing lens group (the second lens group G2) of the catadioptric lens system 1 along the optical axis in response to the focusing operation signal. In this regard, positional information of the focusing lens group at that time is fed back to the CPU 110 of the imaging apparatus 100, and thus the CPU 110 refers to the information the next time it is shifting the focusing lens group through the drive motor 130.

Incidentally, in the imaging apparatus 100, for simplification of description, the driving system is illustrated as only one system. However, the apparatus may separately include a zooming system, a focusing system, a photography mode switching system, and the like. Further, when having a camera shake correction function, the apparatus may include a vibration-proof driving system which drives a blur correction lens (group). In addition, the above-mentioned driving system may have several of these functions in a shared manner.

Further, in the above-mentioned embodiment, although the above description was given in a case where the specific object of the imaging apparatus 100 is a digital still camera, the present disclosure is not limited to this, and various other electronics may be the specific objects of the imaging apparatus 100. For example, an interchangeable-lens camera, a digital video camera, and mobile phone in which the digital video camera is built, and various other electronics such as a PDA (Personal Digital Assistant) may be employed as the specific objects of the imaging apparatus 100.

EXAMPLES

Next, specific numerical examples of the catadioptric lens system according to the present embodiment will be described.

Note that, in the accompanying drawings and tables, the reference signs and the like are defined as follows. "si" represents the i-th surface, where the reference number i sequentially increases in order of light travel from the object side. Likewise, "ri" represents the radius of curvature (mm) of the i-th surface, where the reference number i sequentially increases in order of light travel. "di" represents the on-axis space (mm) between the i-th surface and an (i+1)th surface. Further, regarding "di", "variable" means that the corresponding space is a variable space. "ni" represents the refractive index of a material of an optical element having the i-th surface at the d-line (a wavelength of 587.6 nm). "vi" represents the Abbe number of the material of the optical element having the i-th surface at the d-line.

Numerical Example 1

Tables 1 and 2 show lens data in which specific numerical values are applied to the catadioptric lens system 1 according to the first configuration example shown in FIG. 1. Particularly, Table 1 shows basic lens data, and Table 2 shows the other data.

In the catadioptric lens system 1, the second lens group G2 is shifted by focusing, and values of on-axis surface spaces D14 and D16 before and after the second lens group G2 are variable. Table 2 shows values of the variable on-axis surface spaces D14 and D16 during infinity focusing and during close-up focusing (photography magnification ratio β=0.1). Note that, in Table 2, "Fno" represents the F number, "ω" represents the half angle of view. "B.F." represents the back focal length, and also represents a distance in the optical axis from the final lens surface to the image plane Simg.

In the catadioptric lens system 1, the first lens group G1 includes, in order of light travel from the object side: a first lens L11 formed of a positive lens; a concave mirror (primary mirror) M1; a convex mirror (secondary mirror) M2; a second lens L12 formed of a negative lens; and a third lens L13 formed of a positive lens. The image-side surface of the concave mirror M1 is formed by forming a reflective surface on a part (other than the center portion) of the image-side surface of the lens which is concave toward the object side. The object-side surface of the convex mirror M2 is formed by forming a reflective surface on the overall object-side surface of the lens which is convex toward the image side. The second lens group G2 is formed of a single lens (negative lens L21) having a biconcave shape. The third lens group G3 is formed of a single lens (positive lens L31) of which the object-side surface has a convex shape.

TABLE 1

Example 1

|  | si | ri | di | ni | vi |
|---|---|---|---|---|---|
| L11 | 1 | r1 = 117.3450 | d1 = 2.400 | n1 = 1.51680 | v1 = 64.2 |
|  | 2 | r2 = −128.8938 | d2 = 14.400 | n2 = | v2 = |
| M1 | 3 | r3 = −31.9210 | d3 = 2.000 | n3 = 1.51680 | v3 = 64.2 |
|  | 4 | r4 = −54.0553 | d4 = −2.000 | n4 = 1.51680 | v4 = 64.2 |
|  | 5 | r5 = −31.9210 | d5 = −11.920 | n5 = | v5 = |
| M2 | 6 | r6 = −21.0777 | d6 = −1.400 | n6 = 1.51680 | v6 = 64.2 |
|  | 7 | r7 = −38.3231 | d7 = 1.400 | n7 = 1.51680 | v7 = 64.2 |
|  | 8 | r8 = −21.0777 | d8 = 11.920 | n8 = | v8 = |
| M1 | 9 | r9 = −31.9210 | d9 = 2.000 | n9 = 1.51680 | v9 = 64.2 |
|  | 10 | r10 = −54.0553 | d10 = 0.732 | n10 = | v10 = |
| L12 | 11 | r11 = −24.5314 | d11 = 0.600 | n11 = 1.64769 | v11 = 33.8 |
|  | 12 | r12 = 14.3738 | d12 = 1.875 | n12 = | v12 = |
| L13 | 13 | r13 = 20.8871 | d13 = 1.503 | n13 = 1.77250 | v13 = 49.6 |
|  | 14 | r14 = −20.8871 | d14 = variable | n14 = | v14 = |
| L21 | 15 | r15 = −30.8104 | d15 = 0.600 | n15 = 1.77250 | v15 = 49.6 |
|  | 16 | r16 = 17.9314 | d16 = variable | n16 = | v16 = |
| L31 | 17 | r17 = 16.0052 | d17 = 1.114 | n17 = 1.92286 | v17 = 20.9 |
|  | 18 | r18 = 37.6873 | d18 = | n18 = | v18 = |

TABLE 2

Example 1

|  | Infinity Focusing | Close-Up Focusing (β = 0.1) |
|---|---|---|
| Focal Length | 100.00 | |
| Fno. | 4.50 | |
| ω (degree) | 3.18 | |
| B.F. | 7.127 | |
| d14 | 0.492 | 6.661 |
| d16 | 6.885 | 0.716 |

Numerical Example 2

Similar to Numerical Example 1 mentioned above, Tables 3 and 4 show lens data, in which specific numerical values are applied to the catadioptric lens system 2 according to the second configuration example shown in FIG. 2, through Numerical Example 2.

The basic lens configuration of the catadioptric lens system 2 is substantially the same as the catadioptric lens system 1 of FIG. 1.

TABLE 3

Example 2

|  | si | ri | di | ni | vi |
|---|---|---|---|---|---|
| L11 | 1 | r1 = 53.5559 | d1 = 2.333 | n1 = 1.61800 | v1 = 63.4 |
|  | 2 | r2 = −95.2932 | d2 = 12.333 | n2 = | v2 = |
| M1 | 3 | r3 = −30.3959 | d3 = 1.667 | n3 = 1.83481 | v3 = 42.7 |
|  | 4 | r4 = −54.2784 | d4 = −1.667 | n4 = 1.83481 | v4 = 42.7 |
|  | 5 | r5 = −30.3959 | d5 = −10.267 | n5 = | v5 = |
| M2 | 6 | r6 = −18.8546 | d6 = −1.167 | n6 = 1.65160 | v6 = 58.4 |
|  | 7 | r7 = −37.8749 | d7 = 1.167 | n7 = 1.65160 | v7 = 58.4 |
|  | 8 | r8 = −18.8546 | d8 = 10.267 | n8 = | v8 = |
| M1 | 9 | r9 = −30.3959 | d9 = 1.667 | n9 = 1.83481 | v9 = 42.7 |
|  | 10 | r10 = −54.2784 | d10 = 0.546 | n10 = | v10 = |
| L12 | 11 | r11 = −12.4033 | d11 = 0.500 | n11 = 1.84666 | v11 = 23.8 |
|  | 12 | r12 = 18.3677 | d12 = 1.092 | n12 = | v12 = |
| L13 | 13 | r13 = 31.5562 | d13 = 1.013 | n13 = 1.84666 | v13 = 23.8 |
|  | 14 | r14 = −12.2959 | d14 = variable | n14 = | v14 = |
| L21 | 15 | r15 = −34.4127 | d15 = 0.500 | n15 = 1.91082 | v15 = 35.3 |
|  | 16 | r16 = 10.5928 | d16 = variable | n16 = | v16 = |
| L31 | 17 | r17 = 11.3213 | d17 = 2.115 | n17 = 1.75520 | v17 = 27.5 |
|  | 18 | r18 = −203.5757 | d18 = | n18 = | v18 = |

TABLE 4

Example 2

|  | Infinity Focusing | Close-Up Focusing (β = 0.1) |
|---|---|---|
| Focal Length | 100.00 | |
| Fno. | 4.68 | |
| ω (degree) | 2.66 | |
| B.F. | 5.273 | |
| d14 | 0.412 | 5.095 |
| d16 | 6.656 | 1.973 |

Numerical Example 3

Likewise, Tables 5 and 6 show lens data, in which specific numerical values are applied to the catadioptric lens system 3 according to the third configuration example shown in FIG. 3, through Numerical Example 3.

In the catadioptric lens system 3, the second lens group G2 is shifted by focusing, and values of on-axis surface spaces D18 and D20 before and after the second lens group G2 is variable. Table 6 shows values of the variable on-axis surface spaces D18 and D20 during infinity focusing and during close-up focusing (photography magnification ratio β=0.1).

In the catadioptric lens system 3, the basic lens configurations of the second lens group G2 and third lens group G3 are substantially the same as the basic lens configurations of the catadioptric lens system 1 of FIG. 1, but there is a difference therebetween in the lens configuration of the first lens group G1. In the catadioptric lens system 3, the first lens group G1 includes, in order of light travel from the object side: a first lens L11 formed of a positive lens; a concave mirror (primary mirror) M1; a second lens L12 formed of a positive lens; a convex mirror (secondary mirror) M2; a third lens L13 formed of a negative lens; and a fourth lens L14 formed of a positive lens. The image-side surface of the concave mirror M1 is formed by forming a reflective surface on a part (other than the center portion) of the image-side surface of the lens which is concave toward the object side. The object-side surface of the convex mirror M2 is formed by forming a reflective surface on the overall object-side surface of the lens which is convex toward the image side. The center portions of the convex mirror M2 and the first lens L11 and the second lens L12 are formed as a cemented lens. That is, the image-side surface of the convex mirror M2 is cemented onto the object-side surface of the first lens L11 at the center portion thereof, and the object-side surface of the second lens L12 is cemented onto the image-side surface of the first lens L11 at the center portion thereof.

TABLE 5

Example 3

| | si | ri | di | ni | vi |
|---|---|---|---|---|---|
| L11 | 1 | r1 = 70.3465 | d1 = 2.000 | n1 = 1.51823 | v 1 = 59.0 |
|  | 2 | r2 = -126.9635 | d2 = 11.334 | n2 = | v 2 = |
| M1 | 3 | r3 = -34.5879 | d3 = 1.667 | n3 = 1.54814 | v 3 = 45.8 |
|  | 4 | r4 = -59.6342 | d4 = -1.667 | n4 = 1.54814 | v 4 = 45.8 |
|  | 5 | r5 = -34.5879 | d5 = -10.258 | n5 = | v 5 = |
| L12 | 6 | r6 = -24.5851 | d6 = -1.076 | n6 = 1.61800 | v 6 = 63.4 |
| L11 | 7 | r7 = -126.9635 | d7 = -2.000 | n7 = 1.51823 | v 7 = 59.0 |
|  | 8 | r8 = 70.3465 | d8 = -0.667 | n8 = 1.51680 | v 8 = 64.2 |
| M2 | 9 | r9 = -41.6425 | d9 = 0.667 | n9 = 1.51680 | v 9 = 64.2 |
| L11 | 10 | r10 = 70.3465 | d10 = 2.000 | n10 = 1.51823 | v 10 = 59.0 |
| L12 | 11 | r11 = -126.9635 | d11 = 1.076 | n11 = 1.61800 | v 11 = 63.4 |
|  | 12 | r12 = -24.5851 | d12 = 10.258 | n12 = | v 12 = |
| M1 | 13 | r13 = -34.5879 | d13 = 1.667 | n13 = 1.54814 | v 13 = 45.8 |
|  | 14 | r14 = -59.6342 | d14 = 0.670 | n14 = | v 14 = |
| L13 | 15 | r15 = -10.0278 | d15 = 0.500 | n15 = 1.84666 | v 15 = 23.8 |
|  | 16 | r16 = 32.1317 | d16 = 0.822 | n16 = | v 16 = |
| L14 | 17 | r17 = 98.8914 | d17 = 1.054 | n17 = 1.84666 | v 17 = 23.8 |
|  | 18 | r18 = -10.2339 | d18 = Variable | n18 = | v 18 = |
| L21 | 19 | r19 = -41.3622 | d19 = 0.500 | n19 = 1.91082 | v 19 = 35.3 |
|  | 20 | r20 = 10.8992 | d20 = Variable | n20 = | v 20 = |
| L31 | 21 | r21 = 11.6243 | d21 = 2.195 | n21 = 1.69895 | v 21 = 30.1 |
|  | 22 | r22 = -84.2910 | d22 = | n22 = | v 22 = |

TABLE 6

Example 3

|  | Infinity Focusing | Close-Up Focusing (β = 0.1) |
|---|---|---|
| Focal Length | 100.00 | |
| Fno. | 4.43 | |
| ω (degree) | 2.67 | |
| B. F. | 5.273 | |
| d18 | 0.404 | 5.233 |
| d20 | 7.022 | 2.189 |

Numerical Example 4

Likewise, Tables 7 to 9 show lens data, in which specific numerical values are applied to the catadioptric lens system 4 according to the fourth configuration example shown in FIG. 4, through Numerical Example 4.

In the catadioptric lens system 4, the second lens group G2 is shifted by focusing, and values of on-axis surface spaces D12 and D14 before and after the second lens group G2 is variable. Table 8 shows values of the variable on-axis surface spaces D12 and D14 during infinity focusing and during close-up focusing (photography magnification ratio β=0.1).

In the catadioptric lens system 4, the basic lens configurations of the second lens group G2 and third lens group G3 are substantially the same as the basic lens configurations of the catadioptric lens system 1 of FIG. 1, but there is a difference therebetween in the lens configuration of the first lens group G1. In the catadioptric lens system 4, the first lens group G1 includes, in order of light travel from the object side: a first lens L11 formed of a positive lens; a concave mirror (primary mirror) M1; a convex mirror (secondary mirror) M2; and a second lens L12 formed of a positive lens. The image-side surface of the concave mirror M1 is formed by forming a reflective surface on a part (other than the center portion) of the image-side surface of the lens which is concave toward the object side. The object-side surface of the convex mirror M2 is formed by forming a reflective surface on the overall object-side surface of the lens which is convex toward the image side.

In the catadioptric lens system 4, both surfaces of the second lens L12 are formed to be aspheric. Assuming that the vertex of the surface is the origin point, the optical axis direction is the X axis, and the height in the direction perpendicular to the optical axis is h, the shape of each aspheric surface can be represented by the following expression. The radii of curvature of the aspheric surfaces in the lens data of Table 7 represent the numerical values of the radius of curvatures near the optical axis (paraxial). Table 9 shows data of the aspheric surface coefficients. In the numerical values shown in Table 9, the reference sign "E" means that a numerical value following this is a "power exponent" having a base of 10 and that this numerical value having a base of 10 and expressed by an exponential function is multiplied by a numerical value before the "E". For example, "1.0E-05" represents "$1.0 \times 10^{-5}$".

$$X = \frac{h^2/R}{1 + \sqrt{1-(1+K)h^2/R^2}} + \sum A_i h^i$$

Here,
$A_i$ is the i-th order aspheric surface coefficient,
R is the paraxial radius of curvature, and
K is the conic constant.

TABLE 7

Example 4

| | si | ri | di | ni | vi |
|---|---|---|---|---|---|
| L11 | 1 | r1 = 73.9406 | d1 = 2.333 | n1 = 1.72916 | v1 = 54.7 |
| | 2 | r2 = −74.4855 | d2 = 12.000 | n2 = | v2 = |
| M1 | 3 | r3 = −27.2043 | d3 = 1.667 | n3 = 1.91082 | v3 = 35.3 |
| | 4 | r4 = −49.2497 | d4 = −1.667 | n4 = 1.91082 | v4 = 35.3 |
| | 5 | r5 = −27.2043 | d5 = −9.933 | n5 = | v5 = |
| M2 | 6 | r6 = −16.9417 | d6 = −1.167 | n6 = 1.78800 | v6 = 47.3 |
| | 7 | r7 = −30.8031 | d7 = 1.167 | n7 = 1.78800 | v7 = 47.3 |
| | 8 | r8 = −16.9417 | d8 = 9.933 | n8 = | v8 = |
| M1 | 9 | r9 = −27.2043 | d9 = 1.667 | n9 = 1.91082 | v9 = 35.3 |
| | 10 | r10 = −49.2497 | d10 = 0.588 | n10 = | v10 = |
| L12 | 11 | r11 = −8.0678 | d11 = 0.833 | n11 = 1.53110 | v11 = 55.3 |
| | 12 | r12 = −8.0380 | d12 = variable | n12 = | v12 = |
| L21 | 13 | r13 = −321.6117 | d13 = 0.500 | n13 = 1.77250 | v13 = 49.6 |
| | 14 | r14 = 9.0242 | d14 = variable | n14 = | v14 = |
| L31 | 15 | r15 = 8.8668 | d15 = 0.957 | n15 = 1.84666 | v15 = 23.8 |
| | 16 | r16 = 13.3330 | d16 = | n16 = | v16 = |

TABLE 8

Example 4

| | Infinity Focusing | Close-Up Focusing ($\beta = 20.1$) |
|---|---|---|
| Focal Length | 100.00 | |
| Fno. | 4.59 | |
| ω (degree) | 2.68 | |
| B.F. | 6.039 | |
| d12 | 0.419 | 4.456 |
| d14 | 8.103 | 4.065 |

TABLE 9

Example 4

| si | K | A4 | A6 | A8 | A10 |
|---|---|---|---|---|---|
| 11 | 0 | 2.86362E−03 | −5.95789E−05 | 1.08541E−06 | −3.52010E−08 |
| 12 | 0 | 2.77384E−03 | −4.24607E−05 | 0.00000E+00 | 0.00000E+00 |

[Other Numerical Value Data of Respective Examples]

Tables 10 and 11 show collections of values relating to the respective conditional expressions mentioned above in the respective numerical examples. As can be seen from Table 10, the values of the respective numerical examples are within the numerical ranges of the respective conditional expressions.

TABLE 10

| Conditional Expression | Example 1 | Example 2 | Example 3 | Example 4 |
|---|---|---|---|---|
| (1) f1/f | 0.623 | 0.589 | 0.595 | 0.538 |
| (2) f2/f | −0.145 | −0.088 | −0.094 | −0.113 |
| (3) f/f12 | 0.724 | 0.552 | 0.564 | 0.737 |
| (4) f3/f | 0.291 | 0.141 | 0.146 | 0.282 |

TABLE 11

| Reference Sign | Example 1 | Example 2 | Example 3 | Example 4 |
|---|---|---|---|---|
| f | 100.000 | 100.000 | 100.000 | 100.000 |
| f1 | 62.284 | 58.858 | 59.475 | 53.753 |
| f2 | −14.525 | −8.787 | −9.365 | −11.301 |
| f12 | 138.170 | 181.132 | 177.170 | 135.594 |
| f3 | 29.089 | 14.141 | 14.640 | 28.174 |

[Aberration Performance]

FIGS. 5A to 5C show spherical aberration, astigmatism, and distortion during infinity focusing of the catadioptric lens system 1 corresponding to Numerical Example 1. FIGS. 6A to 6C show the same aberrations during close-up focusing. Each aberration diagram shows aberrations when the d-line (the wavelength of 587.6 nm) is set as a reference wavelength. In each spherical aberration diagram, the vertical axis indicates a ratio of the aberration to a full-aperture F value, the horizontal axis represents defocus, the solid line represents a value thereof at the d-line (a wavelength of 587.6 nm), the chain line represents a value thereof at g-line (a wavelength of 435.8 nm), and the dotted line represents a value thereof at C-line (a wavelength of 656.3 nm). In each astigmatism diagram, the vertical axis represents the angle of view, the horizontal axis represents defocus, the solid line represents a value thereof on the sagittal image plane, and the dashed line represents a value thereof on the meridional image plane. In each distortion diagram, the vertical axis represents the angle of view, and the horizontal axis represents the percentage %. ω represents the half angle of view.

Likewise, FIGS. 7A to 12C show various aberrations of the catadioptric lens systems 2 to 4 corresponding to Numerical Examples 2 to 4.

As can be seen from the respective aberration diagrams, it is apparent that, in each example, the various aberrations are satisfactorily corrected, and imaging performance, which is favorable even during close-up focusing at the photography magnification ratio β of 0.1, is obtained.

Other Embodiments

The technology according to the present disclosure is not limited to the description of the examples and the embodiments mentioned above, and may be modified into various forms.

The shapes of components and the numerical values described or shown in the above-mentioned numerical embodiments are only illustrative examples of the embodiments for carrying out the present disclosure, and they should not be interpreted as limiting the technical scope of the present disclosure.

Further, the above-mentioned embodiments and examples described the configuration in which the lens system is formed of three lens groups. However, it may be possible to adopt a configuration in which a lens, which has no refractive power in practice, is further provided.

Furthermore, for example, the technology according to the present disclosure may have the following configurations.

(1) A catadioptric lens system including, in order of light travel:

a first lens group that includes a concave mirror and a convex mirror and has a positive refractive power;

a second lens group that is positioned on the image side of the concave mirror and has a negative refractive power; and a third lens group that has a positive refractive power, wherein a close-range object is brought into focus by moving the second lens group in a direction parallel with the optical axis, and wherein the following conditional expression is satisfied $$0 < f/f12 \qquad (0)$$

where f is a focal length of the whole system in a state where the focus is at infinity, and f12 is a composite focal length of the first lens group and the second lens group in a state where the focus is at infinity.

(2) The catadioptric lens system according to item (1), wherein the following conditional expression is satisfied $$0.40 < f1/f < 0.80 \qquad (1)$$

where f1 is a focal length of the first lens group.

(3) The catadioptric lens system according to (1) or (2), wherein the following conditional expression is satisfied $$-0.20 < f2/f < -0.05 \qquad (2)$$

where f2 is a focal length of the second lens group.

(4) The catadioptric lens system according to any one of items (1) to (3), wherein the following conditional expression is satisfied $$0.40 < f/f12 < 1.00 \qquad (3)$$

(5) The catadioptric lens system according to any one of items (1) to (4), wherein the following conditional expression is satisfied $$0.10 < f3/f < 0.40 \qquad (4)$$

where f3 is a focal length of the third lens group.

(6) The catadioptric lens system according to any one of items (1) to (5), wherein the second lens group is formed of a single lens having a biconcave shape.

(7) The catadioptric lens system according to any one of items (1) to (6), wherein the third lens group G3 is formed of a single lens of which the object-side surface has a convex shape.

(8) The catadioptric lens system according to any one of items (1) to (7), wherein an image-side surface of the concave mirror is formed by forming a reflective surface on a part of the image-side surface in a lens which is concave toward the object side, and wherein an object-side surface of the convex mirror is formed by forming a reflective surface on the object-side surface in a lens which is convex toward the image side.

(9) The catadioptric lens system according to any one of items (1) to (8), further including a lens that has no refractive power in practice.

(10) An imaging apparatus including:

a catadioptric lens system; and an imaging device that outputs a captured image signal corresponding to an optical image which is formed by the catadioptric lens system, wherein the catadioptric lens system includes, in order of light travel, a first lens group that includes a concave mirror and a convex mirror and has a positive refractive power, a second lens group that is positioned on the image side of the concave mirror and has a negative refractive power, and a third lens group that has a positive refractive power, and wherein a close-range object is brought into focus by moving the second lens group in a direction parallel with the optical axis, and wherein the following conditional expression is satisfied $$0 < f/f12 \qquad (0)$$

where f is a focal length of the whole system in a state where the focus is at infinity, and f12 is a composite focal length of the first lens group and the second lens group in a state where the focus is at infinity.

(11) The imaging apparatus according to item (10), wherein the catadioptric lens system further includes a lens that has no refractive power in practice.

The present disclosure contains subject matter related to that disclosed in Japanese Priority Patent Application JP 2011-149111 filed in the Japan Patent Office on Jul. 5, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A catadioptric lens system comprising, in order of light travel:

a first lens group that includes a concave mirror and a convex mirror and has a positive refractive power;

a second lens group that is positioned on the image side of the concave mirror and has a negative refractive power; and a third lens group that has a positive refractive power, wherein a close-range object is brought into focus by moving the second lens group in a direction parallel with the optical axis, and wherein the following conditional expression is satisfied $$0 < f/f12 \qquad (0)$$

where f is a focal length of the whole system in a state where the focus is at infinity, and f12 is a composite focal length of the first lens group and the second lens group in a state where the focus is at infinity.

2. The catadioptric lens system according to claim 1, wherein the following conditional expression is satisfied $$0.40 < f1/f < 0.80 \quad (1)$$

where f1 is a focal length of the first lens group.

3. The catadioptric lens system according to claim 1, wherein the following conditional expression is satisfied $$-0.20 < f2/f < -0.05 \quad (2)$$

where f2 is a focal length of the second lens group.

4. The catadioptric lens system according to claim 1, wherein the following conditional expression is satisfied $$0.40 < f/f12 < 1.00 \quad (3).$$

5. The catadioptric lens system according to claim 1, wherein the following conditional expression is satisfied $$0.10 < f3/f < 0.40 \quad (4)$$

where f3 is a focal length of the third lens group.

6. The catadioptric lens system according to claim 1, wherein the second lens group is formed of a single lens having a biconcave shape.

7. The catadioptric lens system according to claim 1, wherein the third lens group G3 is formed of a single lens of which the object-side surface has a convex shape.

8. The catadioptric lens system according to claim 1,
wherein an image-side surface of the concave mirror is formed by forming a reflective surface on a part of the image-side surface in a lens which is concave toward the object side, and
wherein an object-side surface of the convex mirror is formed by forming a reflective surface on the object-side surface in a lens which is convex toward the image side.

9. An imaging apparatus comprising:
a catadioptric lens system; and
an imaging device that outputs a captured image signal corresponding to an optical image which is formed by the catadioptric lens system,
wherein the catadioptric lens system includes,
in order of light travel,
a first lens group that includes a concave mirror and a convex mirror and has a positive refractive power,
a second lens group that is positioned on the image side of the concave mirror and has a negative refractive power, and
a third lens group that has a positive refractive power, and
wherein a close-range object is brought into focus by moving the second lens group in a direction parallel with the optical axis, and
wherein the following conditional expression is satisfied $$0 < f/f12 \quad (0)$$

where
f is a focal length of the whole system in a state where the focus is at infinity, and
f12 is a composite focal length of the first lens group and the second lens group in a state where the focus is at infinity.

10. The imaging apparatus according to claim 9, wherein the following conditional expression is satisfied $$0.40 < f1/f < 0.80 \quad (1)$$

where f1 is a focal length of the first lens group.

11. The imaging apparatus according to claim 9, wherein the following conditional expression is satisfied $$-0.20 < f2/f < -0.05 \quad (2)$$

where f2 is a focal length of the second lens group.

12. The imaging apparatus according to claim 9, wherein the following conditional expression is satisfied $$0.40 < f/f12 < 1.00 \quad (3).$$

13. The imaging apparatus according to claim 9, wherein the following conditional expression is satisfied $$0.10 < f3/f < 0.40 \quad (4)$$

where f3 is a focal length of the third lens group.

14. The imaging apparatus according to claim 9, wherein the second lens group is formed of a single lens having a biconcave shape.

15. The imaging apparatus according to claim 9, wherein the third lens group G3 is formed of a single lens of which the object-side surface has a convex shape.

16. The imaging apparatus according to claim 9,
wherein an image-side surface of the concave mirror is formed by forming a reflective surface on a part of the image-side surface in a lens which is concave toward the object side, and
wherein an object-side surface of the convex mirror is formed by forming a reflective surface on the object-side surface in a lens which is convex toward the image side.

* * * * *